United States Patent
Chan (10) Patent No.: US 10,779,374 B1
(45) Date of Patent: Sep. 15, 2020

(54) DRIVING DEVICE

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/707,267

(22) Filed: Dec. 9, 2019

(30) Foreign Application Priority Data

Jul. 29, 2019 (TW) .............................. 108126711 A (51) Int. Cl.
*H05B 45/382* (2020.01)
*H05B 45/325* (2020.01)
*H05B 45/40* (2020.01)

(52) U.S. Cl.
CPC ......... *H05B 45/382* (2020.01); *H05B 45/325* (2020.01); *H05B 45/40* (2020.01)

(58) Field of Classification Search
CPC .... H05B 45/382; H05B 45/325; H05B 45/40; H02M 1/10; H02M 1/4208; H02M 1/4225; H02M 2001/0009; H02M 2001/0022; H02M 2001/0025; H02M 2001/0054; H02M 2001/0058; H02M 3/33507; H02M 3/33523; H02M 7/02; H02M 7/043; H02M 7/1623
See application file for complete search history.

(56) References Cited

U.S. PATENT DOCUMENTS

| | | | | |
|---|---|---|---|---|
| 6,069,803 | A | * | 5/2000 | Cross ................ H02M 3/33569 363/21.14 |
| 8,009,448 | B2 | * | 8/2011 | Liu .................... H02M 3/33569 363/21.01 |
| 9,084,316 | B2 | | 7/2015 | Melanson et al. |

(Continued)

FOREIGN PATENT DOCUMENTS

| CN | 103201937 A | 7/2013 |
|---|---|---|
| CN | 103262399 A | 8/2013 |

(Continued)

OTHER PUBLICATIONS

Chinese language office action dated Mar. 19, 2020, issued in application No. TW 108126711.

*Primary Examiner* — Renan Luque
(74) *Attorney, Agent, or Firm* — McClure, Qualey & Rodack, LLP (57) ABSTRACT

A driving device for driving a light-emitting element includes a bridge rectifier, a first capacitor, an inductive control circuit, a transformer, a power switch element, an output stage circuit, and a controller. The bridge rectifier generates a rectified voltage. The inductive control circuit includes an inductor, and adjusts an inductive current through the inductor according to the rectified voltage and a first control voltage. The first control voltage is selectively used to perform a PFM (Pulse Frequency Modulation) operation. The transformer generates a transformation voltage according to the inductive voltage of the inductor. The output stage circuit generates an output voltage according to (Continued)

the transformation voltage. The light-emitting element determines whether to generate light according to the output voltage. The controller detects the rectified voltage, and determines the first control voltage according to the rectified voltage.

13 Claims, 6 Drawing Sheets

(56) References Cited

U.S. PATENT DOCUMENTS

| | | | |
|---|---|---|---|
| 9,497,851 B2 | 11/2016 | Melanson et al. | |
| 9,954,446 B2 | 4/2018 | Fang et al. | |
| 2005/0017695 A1* | 1/2005 | Stanley | H02M 1/4208 323/207 |
| 2011/0216558 A1* | 9/2011 | Uno | H02M 1/4225 363/21.12 |
| 2012/0163052 A1* | 6/2012 | Yonezawa | H02M 1/4225 363/126 |
| 2013/0223120 A1* | 8/2013 | Dragojevic | H02M 7/06 363/126 |
| 2015/0296574 A1* | 10/2015 | Knoedgen | H05B 45/00 315/307 |
| 2017/0077818 A1* | 3/2017 | Werner | H02M 3/33507 |

FOREIGN PATENT DOCUMENTS

| | | |
|---|---|---|
| TW | I460983 B | 11/2014 |
| TW | I620468 B | 4/2018 |

\* cited by examiner

DRIVING DEVICE

CROSS REFERENCE TO RELATED APPLICATIONS

This Application claims priority of Taiwan Patent Application No. 108126711 filed on Jul. 29, 2019, the entirety of which is incorporated by reference herein.

BACKGROUND OF THE INVENTION

Field of the Invention

The disclosure generally relates to a driving device, and more specifically, to a driving device for driving a light-emitting element.

Description of the Related Art

In lighting applications using light-emitting elements, common problems include flickering, which means that light brightness varies in response time periodically. Generally, the human eye can easily detect the flickering of a light source when the switching frequency of the light is below 60 Hz. When the switching frequency of light is above 60 Hz, flickering is not visible to the human eye, but this flickering may nevertheless cause eye fatigue and discomfort. Accordingly, there is a need to propose a novel solution for solving the problems of the prior art.

BRIEF SUMMARY OF THE INVENTION

In an exemplary embodiment, the invention is directed to a driving device for driving a light-emitting element. The driving device includes a bridge rectifier, a first capacitor, an inductive control circuit, a transformer, a power switch element, an output stage circuit, and a controller. The bridge rectifier generates a rectified voltage according to a first input voltage and a second input voltage. The first capacitor stores the rectified voltage. The inductive control circuit includes an inductor, and adjusts an inductive current through the inductor according to the rectified voltage and a first control voltage, so as to generate an inductive voltage. The first control voltage is selectively used to perform a PFM (Pulse Frequency Modulation) operation. The transformer includes a main coil, a secondary coil, and an auxiliary coil. The main coil receives the inductive voltage. The secondary coil generates a transformation voltage. The main coil is coupled through the power switch element to a ground voltage. The power switch element is switched according to a clock voltage. The output stage circuit generates an output voltage according to the transformation voltage. The light-emitting element determines whether to generate light according to the output voltage. The controller is coupled to the bridge rectifier, and is configured to detect the rectified voltage. The controller determines the first control voltage and the clock voltage according to the rectified voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
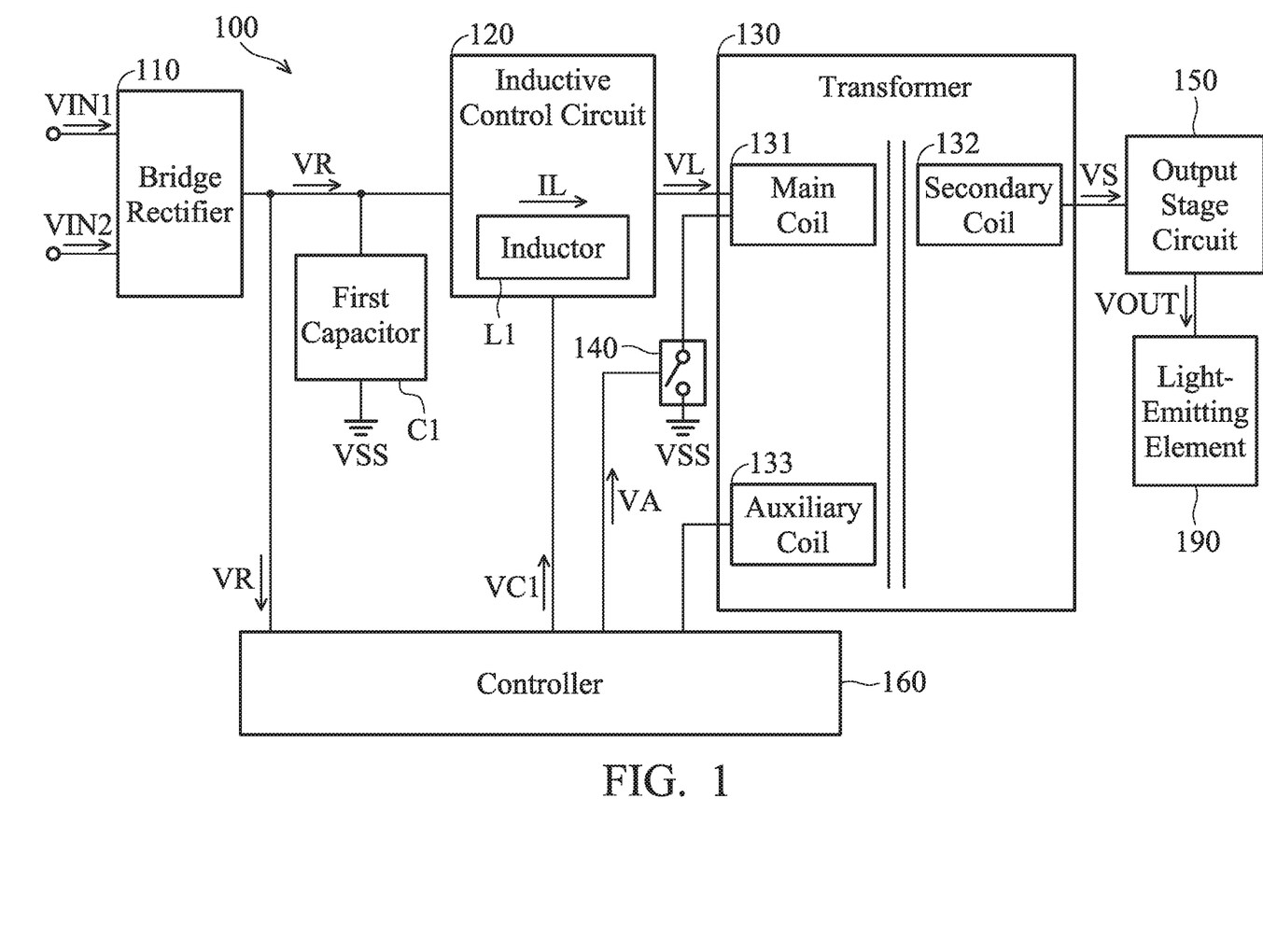
FIG. 1 is a diagram of a driving device according to an embodiment of the invention.

FIG. 1 is a diagram of a driving device 100 according to an embodiment of the invention. The driving device 100 is configured to drive a light-emitting element 190. For example, the driving device 100 may be applicable to a desktop computer, a notebook computer, or an all-in-one computer. As shown in FIG. 1, the driving device 100 includes a bridge rectifier 110, a first capacitor C1, an inductive control circuit 120, a transformer 130, a power switch element 140, an output stage circuit 150, and a controller 160. It should be noted that the driving device 100 may further include other components, such as a voltage regulator and/or a negative feedback circuit, although they are not displayed in FIG. 1.

The bridge rectifier 110 generates a rectified voltage VR according to a first input voltage VIN1 and a second input voltage VIN2. Both the first input voltage VIN1 and the second input voltage VIN2 may come from an external power source. There may be an AC (Alternating Current) voltage difference formed between the first input voltage VIN1 and the second input voltage VIN2. The AC voltage difference may have any frequency and any magnitude. For example, the frequency of the AC voltage difference may be about 50 Hz or 60 Hz, and the RMS (Root-Mean-Square) value of the AC voltage difference may be about 110V or 220V, but they are not limited thereto. The first capacitor C1 can store the rectified voltage VR. The inductive control circuit 120 includes an inductor L1. The inductive control circuit 120 adjusts an inductive current IL through the inductor L1 according to the rectified voltage VR and a first control voltage VC1, so as to generate an inductive voltage VL. The first control voltage VC1 is selectively used to perform a PFM (Pulse Frequency Modulation) operation. The transformer 130 includes a main coil 131, a secondary coil 132, and an auxiliary coil 133. The main coil 131 and the auxiliary coil 133 may be positioned at the same side of the transformer 130. The secondary coil 132 may be positioned at the opposite side of the transformer 130. The main coil 131 receives the inductive voltage VL. In response to the inductive voltage VL, the secondary coil 132 generates a transformation voltage VS. The auxiliary coil 133 is coupled to the controller 160. In addition, the main coil 131 is coupled through the power switch element 140 to the ground voltage VSS (e.g., 0V). The power switch element 140 is switched according to a clock voltage VA, and it can alternatively closed and opened. The output stage circuit 150 generates an output voltage VOUT according to the transformation voltage VS. The light-emitting element 190 determines whether to generate light according to the output voltage VOUT. For example, if the output voltage VOUT has a high logic level, the light-emitting element 190 will generate light, and if the output voltage VOUT has a low logic level, the light-emitting element 190 will not generate any light. The controller 160 may be a control IC (Integrated Circuit), and it may be coupled to the bridge rectifier 110. In some embodiments, the controller 160 includes a detecting circuit, a comparing circuit, and a processing circuit (not shown). The controller 160 can detect the rectified voltage VR and compare it with a first threshold value. The controller 160 determines the first control voltage VC1 and the clock voltage VA according to the rectified voltage VR. For example, if the rectified voltage VR is lower than the first threshold value, the first control voltage VC1 will perform the PFM operation. Conversely, if the rectified voltage VR is higher than or equal to the first threshold value, no PFM operation will be performed. When the driving device 100 is initialized, the clock voltage VA may be maintained at a constant voltage. When the driving device 100 is normally operated, the clock voltage VA can provide a periodical clock waveform. According to practical measurement, such a circuit design can reduce non-ideal flicker, and thus the light-emitting element 190 using the driving device 100 does not tend to cause users' eye fatigue.

The following embodiments will introduce the detailed structure and operation of the driving device 100. It should be understood these figures and descriptions are merely exemplary, rather than limitations of the invention.

Figure 2:
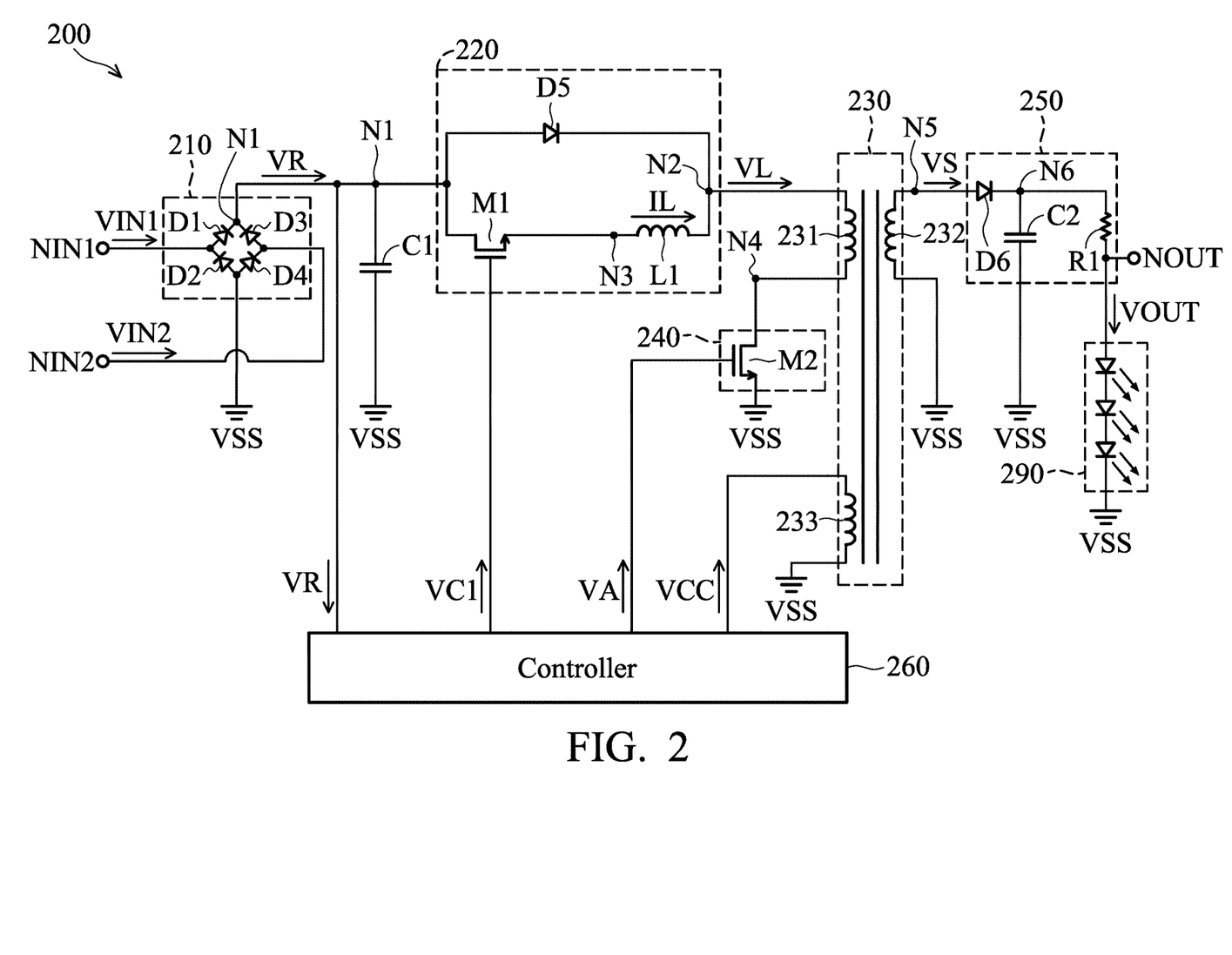
FIG. 2 is a diagram of a driving device according to an embodiment of the invention.

FIG. 2 is a diagram of a driving device 200 according to an embodiment of the invention. In the embodiment of FIG. 2, the driving device 200 with a first input node NIN1, a second input node NIN2, and an output node NOUT includes a bridge rectifier 210, a first capacitor C1, an inductive control circuit 220, a transformer 230, a power switch element 240, an output stage circuit 250, and a controller 260. The first input node NIN1 and the second input node NIN2 of the driving device 200 are arrange for receiving a first input voltage VIN1 and a second input voltage VIN2, respectively, from an external power source. The output node NOUT of the driving device 200 is arranged for outputting an output voltage VOUT to a light-emitting element 290. For example, the light-emitting element 290 may include one or more LEDs (Light-Emitting Diodes) coupled in series between the output node NOUT and a ground voltage VSS. The total number of LEDs is not limited in the invention. If the output voltage VOUT has a high logic level, the light-emitting element 290 will generate light. If the output voltage VOUT has a low logic level, the light-emitting element 290 will not generate any light. In alternative embodiments, the aforementioned LEDs are replaced with mini LEDs, micro LEDs, or OLEDs (Organic LEDs), but they are not limited thereto.

The bridge rectifier 210 includes a first diode D1, a second diode D2, a third diode D3, and a fourth diode D4. The first diode D1 has an anode coupled to the first input node NIN1, and a cathode coupled to a first node N1 for outputting a rectified voltage VR. The second diode D2 has an anode coupled to the ground voltage VSS, and a cathode coupled to the first input node NIN1. The third diode D3 has an anode coupled to the second input node NIN2, and a cathode coupled to the first node N1. The fourth diode D4 has an anode coupled to the ground voltage VSS, and a cathode coupled to the second input node NIN2.

The first capacitor C1 has a first terminal coupled to the first node N1 for receiving the rectified voltage VR, and a second terminal coupled to the ground voltage VSS.

The inductive control circuit 220 includes a fifth diode D5, a first transistor M1, and an inductor L1. The fifth diode D5 has an anode coupled to the first node N1 for receiving the rectified voltage VR, and a cathode coupled to a second node N2 for outputting an inductive voltage VL. The first transistor M1 may be an NMOS transistor (N-type Metal Oxide Semiconductor Field Effect Transistor). The first transistor M1 has a control terminal for receiving a first control voltage VC1, a first terminal coupled to a third node N3, and a second terminal coupled to the first node N1. The inductor L1 has a first terminal coupled to the third node N3, and a second terminal coupled to the second node N2. Generally, the inductive control circuit 220 adjusts an inductive current IL through the inductor L1 according to the rectified voltage VR and the first control voltage VC1, so as to determine the inductive voltage VL at the second node N2.

The transformer 230 includes a main coil 231, a secondary coil 232, and an auxiliary coil 233. The main coil 231 has a first terminal coupled to the second node N2 for receiving the inductive voltage VL, and a second terminal coupled to a fourth node N4. The secondary coil 232 has a first terminal coupled to a fifth node N5 for outputting a transformation voltage VS, and a second terminal coupled to the ground voltage VSS. The auxiliary coil 233 has a first terminal coupled to the controller 260 for receiving a supply voltage VCC therefrom, and a second terminal coupled to the ground voltage VSS. For example, the supply voltage VCC may be a fixed voltage.

The power switch element 240 includes a second transistor M2. The second transistor M2 may be an NMOS transistor. The second transistor M2 has a control terminal for receiving the clock voltage VA, a first terminal coupled to the ground voltage VSS, and a second terminal coupled to the fourth node N4.

The output stage circuit 250 includes a sixth diode D6, a second capacitor C2, and a resistor R1. The sixth diode D6 has an anode coupled to the fifth node N5 for receiving the transformation voltage VS, and a cathode coupled to a sixth node N6. The second capacitor C2 has a first terminal coupled to the sixth node N6, and a second terminal coupled to the ground voltage VSS. The resistor R1 has a first terminal coupled to the sixth node N6, and a second terminal coupled to the output node NOUT.

The controller 260 is coupled to the first node N1 of the bridge rectifier 210, and is configured to detect the rectified voltage VR. The controller 260 determines the first control voltage VC1 and the clock voltage VA according to the rectified voltage VR. The first control voltage VC1 is selectively used to perform a PFM operation. For example, if the rectified voltage VR is lower than a first threshold value, the first control voltage VC1 will perform the PFM operation. Conversely, if the rectified voltage VR is higher than or equal to the first threshold value, no PFM operation will be performed, and the first control voltage VC1 will be maintained at a low logic level.

Figure 3:
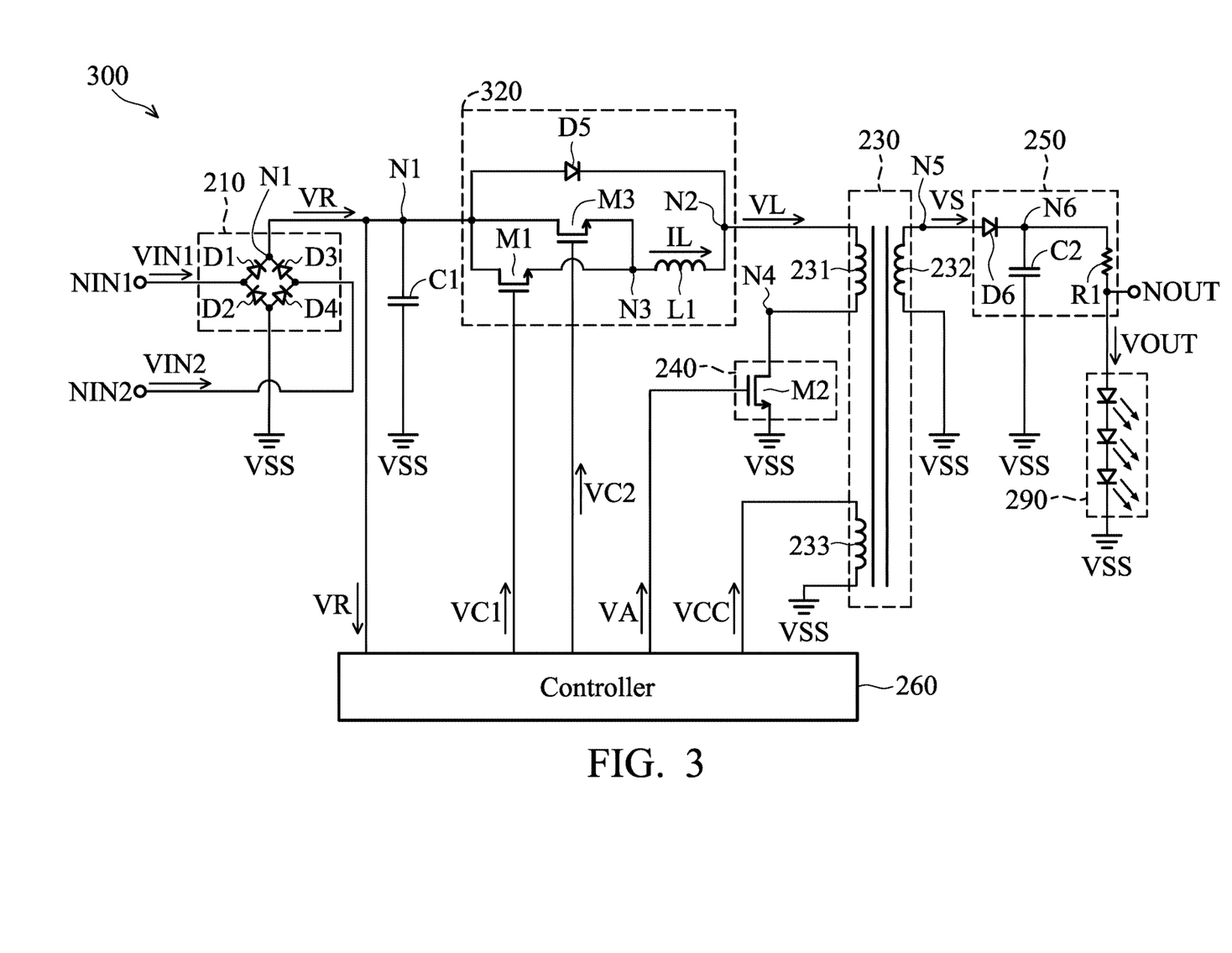
FIG. 3 is a diagram of a driving device according to an embodiment of the invention.

FIG. 3 is a diagram of a driving device 300 according to an embodiment of the invention. FIG. 3 is similar to FIG. 2. In the embodiment of FIG. 3, an inductive control circuit 320 of the driving device 300 further adjusts the inductive current IL through the inductor L1 according to a second control voltage VC2. A controller 360 of the driving device 300 further determines the second control voltage VC2 according to the rectified voltage VR. The second control voltage VC2 is selectively used to perform a PWM (Pulse Wide Modulation) operation. For example, if the rectified voltage VR is higher than a second threshold value, the second control voltage VC2 will perform the PWM operation. Conversely, if the rectified voltage VR is lower than or equal to the second threshold value, no PWM operation will be performed, and the second control voltage VC2 will be maintained at a low logic level. It should be noted that the second threshold value may be higher than the aforementioned first threshold value. Specifically, the inductive control circuit 320 further includes a third transistor M3. The third transistor M3 may be an NMOS transistor. The third transistor M3 has a control terminal for receiving the second control voltage VC2, a first terminal coupled to the third node N3, and a second terminal coupled to the first node N1. According to practical measurements, the incorporation of the third transistor M3 helps to suppress the non-ideal flicker of the light-emitting element 290. Other features of the driving device 300 of FIG. 3 are similar to those of the driving device 200 of FIG. 2. Accordingly, the two embodiments can achieve similar levels of performance.

The following embodiments will introduce how the PFM and PWM operations of the driving device 300 reduce the flicker of the light-emitting element 290. It should be noted that they can also explain the operation principles of the driving device 100 of FIG. 1 and the driving device 200 of FIG. 2.

Figure 4:
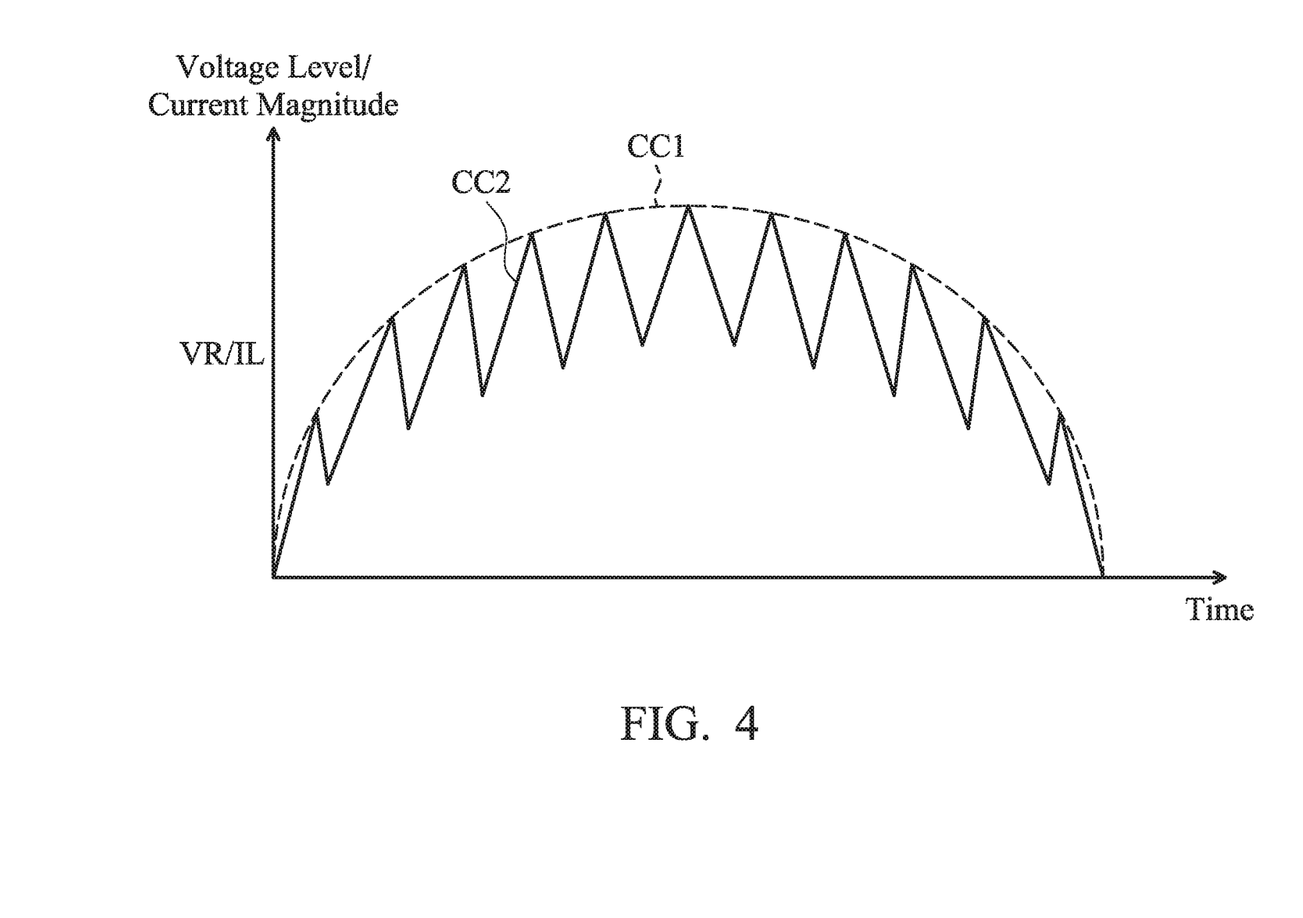
FIG. 4 is a diagram of waveforms of a driving device according to an embodiment of the invention.

FIG. 4 is a diagram of waveforms of the driving device 300 according to an embodiment of the invention. The horizontal axis represents time, and the vertical axis represents voltage level or current magnitude. For example, if a general AC voltage difference with a 60 Hz frequency is input to the bridge rectifier 210, the corresponding output frequency will be 120 Hz, which is the main reason resulting in the flicker of the light-emitting element 290. As shown in FIG. 4, a first curve CC1 represents the waveform of the rectified voltage VR (corresponding to the voltage level of the vertical axis), and a second curve CC2 represents the waveform of the inductive current IL (corresponding to the current magnitude of the vertical axis). That is, the inductor IL is used as an energy storage element. In response to variation of the rectified voltage VR, the inductive current IL through the inductor L1 may alternatively become larger and smaller. With such a design, after the rectified voltage VR is processed by the inductive control circuit 320, the equivalent frequency of the generated inductive voltage VL can be significantly become higher, thereby avoiding non-ideal flick of the light-emitting element 290.

Figure 5:
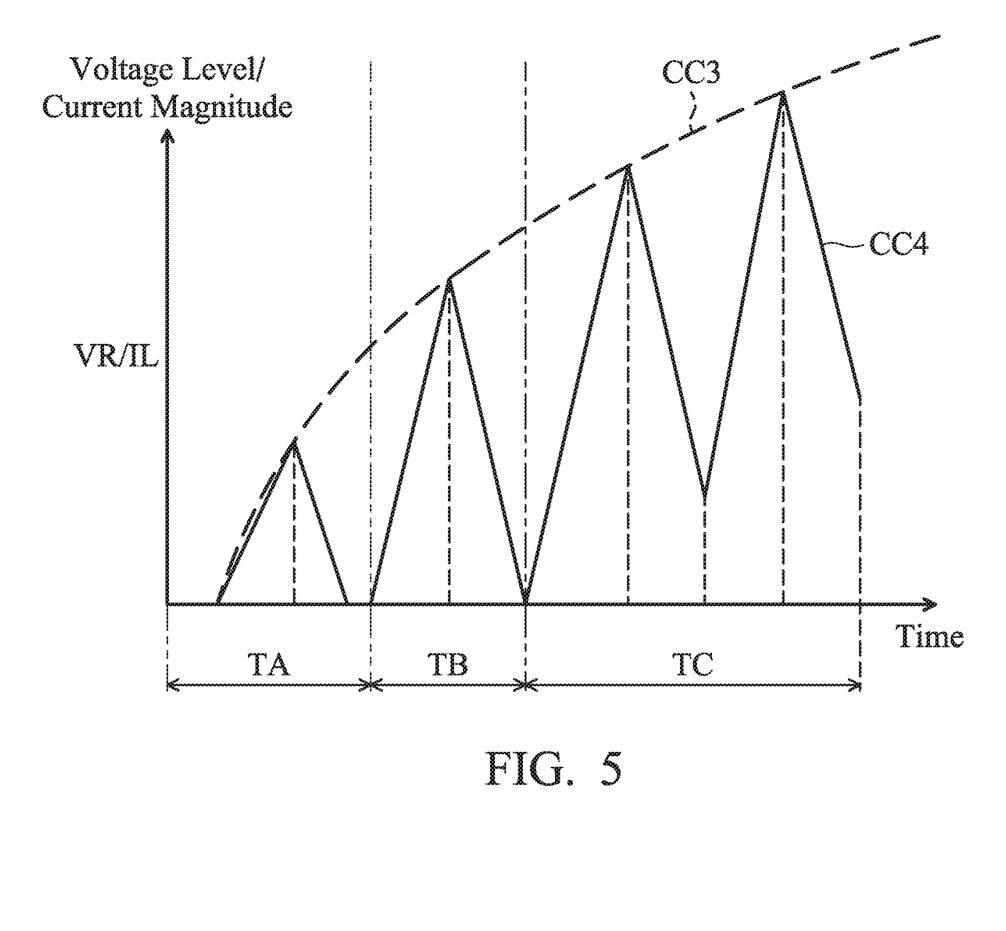
FIG. 5 is a diagram of waveforms of a driving device according to an embodiment of the invention.

FIG. 5 is a diagram of waveforms of the driving device 300 according to an embodiment of the invention. The horizontal axis represents time, and the vertical axis represents voltage level or current magnitude. FIG. 5 is considered as a partial enlargement view of FIG. 4. As shown in FIG. 5, a third curve CC3 represents the waveform of the rectified voltage VR (corresponding to the voltage level of the vertical axis), and a fourth curve CC4 represents the waveform of the inductive current IL (corresponding to the current magnitude of the vertical axis). Specifically, in response to the rectified voltage VR which is gradually getting higher, the inductor L1 can operate in a first stage TA, a second stage TB, and a third stage TC, one after another. During the first stage TA, the inductor L1 operates in a discontinuous conduction mode, and its energy storage rate is lower than its energy release rate. Thus, the inductive current IL is reduced to 0 in advance at the end of the first stage TA. During the second stage TB, the inductor L1 operates in a boundary conduction mode, and its energy storage rate is substantially equal to its energy release rate. Thus, the inductive current IL is exactly reduced to 0 at the end of the second stage TB. During the third stage TC, the inductor L1 operates in a continuous conduction mode, and its energy storage rate is higher than its energy release rate. Thus, the inductive current IL has not been reduced to 0 at the end of the third stage TC. Conversely, in response to the rectified voltage VR which is gradually getting lower, the inductor L1 can operate in the third stage TC, the second stage TB, and the first stage TA, one after another, and their operation principles are similar and not illustrated again herein. According to practical measurements, when the inductor L1 operates in the boundary conduction mode, the driving device 300 has the lowest loss and the highest conversion efficiency. It should be noted that the above PFM and/or PWM operations help the inductor L1 enter the boundary conduction mode, and their detail descriptions are as follows.

Figure 6:
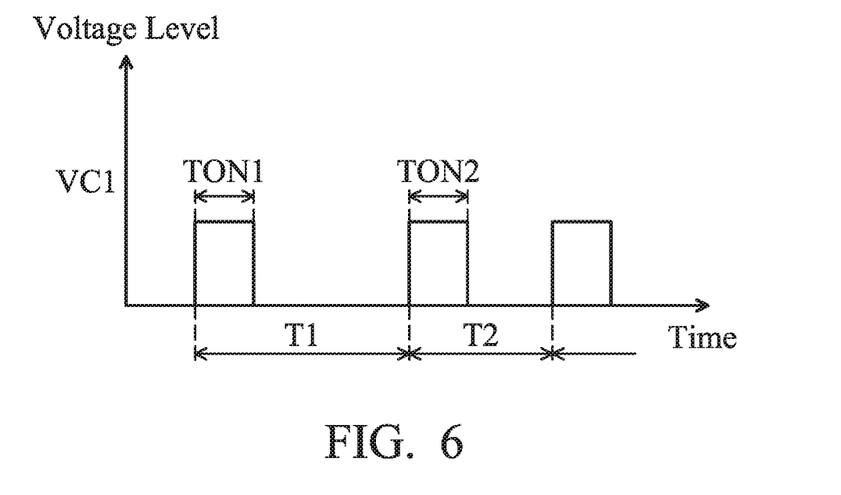
FIG. 6 is a diagram of waveforms of a PFM (Pulse Frequency Modulation) operation according to an embodiment of the invention.

FIG. 6 is a diagram of waveforms of the PFM operation according to an embodiment of the invention. The horizontal axis represents time, and the vertical axis represents voltage level. When the PFM operation is performed, the switching frequency of the first control voltage VC1 is variable, but the turned-on time of the first control voltage VC1 is fixed during each switching period. As shown in FIG. 6, a first switching period T1 and a second switching period T2 of the first control voltage VC1 have different lengths (i.e., different switching frequencies); however, a first turned-on time TON1 of the first switching period T1 and a second turned-on time TON2 of the second switching period T2 have the same lengths. According to practical measurement, the PFM operation can modify the inductor L1 in the discontinuous conduction mode, thereby forcing the inductor L1 to enter the boundary conduction mode in advance.

Figure 7:
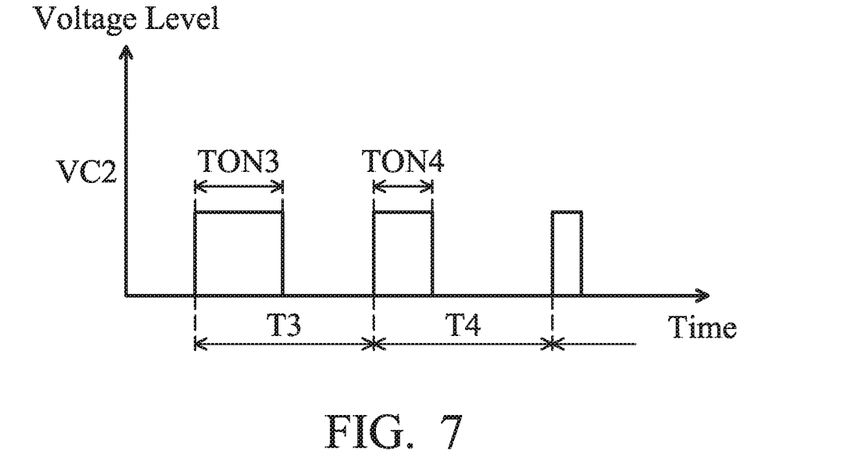
FIG. 7 is a diagram of waveforms of a PWM (Pulse Width Modulation) operation according to an embodiment of the invention.

FIG. 7 is a diagram of waveforms of the PWM operation according to an embodiment of the invention. The horizontal axis represents time, and the vertical axis represents voltage level. When the PWM operation is performed, the switching frequency of the second control voltage VC2 is fixed, but the turned-on time of the second control voltage VC2 is variable during each switching period. As shown in FIG. 7, a third switching period T3 and a fourth switching period T4 of the second control voltage VC2 have the same lengths (i.e., the same switching frequencies); however, a third turned-on time TON3 of the third switching period T3 and a fourth turned-on time TON4 of the fourth switching period T4 have different lengths. According to practical measurement, the PWM operation can modify the inductor L1 in the continuous conduction mode, thereby forcing the inductor L1 to enter the boundary conduction mode in advance.

In conclusion, the operations of the inductive control circuit 320 are described in the following Table I.

TABLE I

Operations of Inductive Control Circuit 320

| Inductor L1 | Discontinuous Conduction Mode | Boundary Conduction Mode | Continuous Conduction Mode |
|---|---|---|---|
| First Transistor M1 (First Control Voltage VC1) | PFM Operation | Cut-off (Low Logic Level) | Cut-off (Low Logic Level) |
| Third Transistor M3 (Second Control Voltage VC2) | Cut-off (Low Logic Level) | Cut-off (Low Logic Level) | PWM Operation |

In some embodiments, the controller 360 determines the first control voltage VC1 and/or the second control voltage VC2 according to the detected rectified voltage VR. For example, if the rectified voltage VR is lower than the first threshold value, the first transistor M1 will perform the PFM operation according to the first control voltage VC1. If the rectified voltage VR is higher than the second threshold value, the third transistor M3 will perform the PWM operation according to the second control voltage VC2. If the rectified voltage VR is between the first threshold value and the second threshold value, neither the PFM operation nor the PWM operation will performed.

In some embodiments, the inductive control circuit 320 includes the first transistor M1 but does not include the third transistor M3. That is, only the PFM operation is selectively used. In alternative embodiments, the inductive control circuit 320 includes the third transistor M3 but does not include the first transistor M1. That is, only the PWM operation is selectively used. Both of the designs can achieve similar performance to that of the above embodiments.

In some embodiments, any of the driving devices 100, 200 and 300 have the following element parameters. The resistance of the resistor R1 may be from 423Ω to 517Ω, such as 470Ω. The capacitance of the first capacitor C1 may be from 96 g to 144 g, such as 120 g. The capacitance of the second capacitor C2 may be from 544 g to 816 µF, such as 680 g. The inductance of the inductor L1 may be from 80 µH to 120 µH, such as 100 µH. The turn ratio of the main coil 231 to the secondary coil 232 may be from 1 to 40, such as 20. The turn ratio of the secondary coil 232 to the auxiliary coil 233 may be from 1 to 3, such as 1.33. The variable frequency range of the first control voltage VC1 for performing the PFM operation may be from 40 kHz to 60 kHz. The fixed frequency of the second control voltage VC2 for performing the PWM operation may be equal to 60 kHz. The first threshold value may be equal to about 30% of the maximum value of the rectified voltage VR. The second threshold value may be equal to about 60% of the maximum value of the rectified voltage VR. The above ranges of element parameters are calculated and obtained according to many experiment results, and they help to optimize the conversion efficiency of the driving devices 100, 200 and 300, and to effectively suppress their flicker.

The invention proposes a novel driving device including an inductive control circuit. According to practical measurements, the proposed driving device using the aforementioned inductive control circuit can suppress non-ideal flickering of the corresponding light-emitting element, so as to reduce users' eye fatigue and discomfort. Generally, the driving device of the invention is not negatively affected by city low-frequency noise, and it is suitable for application in a variety of electronic devices.

Note that the above voltages, currents, resistances, inductances, capacitances and other element parameters are not limitations of the invention. A designer can adjust these parameters according to different requirements. The driving device of the invention is not limited to the configurations of FIGS. 1-7. The invention may merely include any one or more features of any one or more embodiments of FIGS. 1-7. In other words, not all of the features displayed in the figures should be implemented in the driving device of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A driving device for driving a light-emitting element, comprising:
    a bridge rectifier, generating a rectified voltage according to a first input voltage and a second input voltage;
    a first capacitor, storing the rectified voltage;
    an inductive control circuit, comprising an inductor, and adjusting an inductive current through the inductor according to the rectified voltage and a first control voltage, so as to generate an inductive voltage, wherein the first control voltage is selectively used to perform a PFM (Pulse Frequency Modulation) operation;
    a transformer, comprising a main coil, a secondary coil, and an auxiliary coil, wherein the main coil receives the inductive voltage, and the secondary coil generates a transformation voltage;
    a power switch element, wherein the main coil is coupled through the power switch element to a ground voltage, and the power switch element is switched according to a clock voltage;
    an output stage circuit, generating an output voltage according to the transformation voltage, wherein the light-emitting element determines whether to generate light according to the output voltage; and
    a controller, coupled to the bridge rectifier, and detecting the rectified voltage, wherein the controller determines the first control voltage and the clock voltage according to the rectified voltage;
    wherein the bridge rectifier comprises:
    a first diode, wherein the first diode has an anode coupled to a first input node for receiving the first input voltage, and a cathode coupled to a first node for outputting the rectified voltage;

a second diode, wherein the second diode has an anode coupled to the ground voltage, and a cathode coupled to the first input node;

a third diode, wherein the third diode has an anode coupled to a second input node for receiving the second input voltage, and a cathode coupled to the first node; and a fourth diode, wherein the fourth diode has an anode coupled to the ground voltage, and a cathode coupled to the second input node;

wherein the inductive control circuit further comprises:

a fifth diode, wherein the fifth diode has an anode coupled to the first node for receiving the rectified voltage, and a cathode coupled to a second node for outputting the inductive voltage; and a first transistor, wherein the first transistor has a control terminal for receiving the first control voltage, a first terminal coupled to a third node, and a second terminal coupled to the first node;

wherein the inductor has a first terminal coupled to the third node, and a second terminal coupled to the second node.

2. The driving device as claimed in claim 1, wherein the main coil has a first terminal coupled to the second node for receiving the inductive voltage, and a second terminal coupled to a fourth node.

3. The driving device as claimed in claim 2, wherein the secondary coil has a first terminal coupled to a fifth node for outputting the transformation voltage, and a second terminal coupled to the ground voltage.

4. The driving device as claimed in claim 3, wherein the auxiliary coil has a first terminal for receiving a supply voltage from the controller, and a second terminal coupled to the ground voltage.

5. The driving device as claimed in claim 4, wherein the power switch element comprises:

a second transistor, wherein the second transistor has a control terminal for receiving the clock voltage, a first terminal coupled to the ground voltage, and a second terminal coupled to the fourth node.

6. The driving device as claimed in claim 4, wherein the output stage circuit comprises:

a sixth diode, wherein the sixth diode has an anode coupled to the fifth node for receiving the transformation voltage, and a cathode coupled to a sixth node;

a second capacitor, wherein the second capacitor has a first terminal coupled to the sixth node, and a second terminal coupled to the ground voltage; and a resistor, wherein the resistor has a first terminal coupled to the sixth node, and a second terminal coupled to an output node for outputting the output voltage.

7. The driving device as claimed in claim 6, wherein the light-emitting element comprises one or more LEDs (Light-Emitting Diodes) coupled in series between the output node and the ground voltage.

8. The driving device as claimed in claim 1, wherein the inductive control circuit further adjusts the inductive current through the inductor according to a second control voltage, and the controller further determines the second control voltage according to the rectified voltage.

9. The driving device as claimed in claim 8, wherein the second control voltage is selectively used to perform a PWM (Pulse Wide Modulation) operation.

10. The driving device as claimed in claim 8, wherein the inductive control circuit further comprises:

a third transistor, wherein the third transistor has a control terminal for receiving the second control voltage, a first terminal coupled to the third node, and a second terminal coupled to the first node.

11. The driving device as claimed in claim 8, wherein if the rectified voltage is lower than a first threshold value, the PFM operation is performed.

12. The driving device as claimed in claim 11, wherein if the rectified voltage is higher than a second threshold value, the PWM operation is performed.

13. The driving device as claimed in claim 12, wherein if the rectified voltage is between the first threshold value and the second threshold value, neither the PFM operation nor the PWM operation is performed.

* * * * *